United States Patent [19]

Goforth

[11] Patent Number: 4,939,740
[45] Date of Patent: Jul. 3, 1990

[54] CYCLOTRON AUTORESONANCE MASER WITH HELICAL ELECTRON GUIDING CENTER

[75] Inventor: Robert R. Goforth, Encinitas, Calif.

[73] Assignee: General Atomics, San Diego, Calif.

[21] Appl. No.: 203,487

[22] Filed: Jun. 7, 1988

[51] Int. Cl.⁵ .............................................. H01S 3/00
[52] U.S. Cl. ........................................... 372/2; 315/4; 372/37
[58] Field of Search ...................... 378/2, 37; 315/4, 5

[56] References Cited

U.S. PATENT DOCUMENTS

| | | | |
|---|---|---|---|
| 3,822,410 | 7/1974 | Madey | 331/94.5 |
| 4,283,687 | 7/1981 | Madey et al. | 372/2 |
| 4,513,222 | 4/1985 | Chodorow | 372/2 |
| 4,523,127 | 6/1985 | Moeller | 372/2 |
| 4,644,548 | 2/1987 | Gold et al. | 372/2 |
| 4,679,197 | 7/1987 | Hsu | 378/2 |
| 4,697,272 | 9/1987 | Harvey | 372/99 |
| 4,745,617 | 5/1988 | Harvey | 373/96 |

OTHER PUBLICATIONS

"Relativistic Gyrotrons and Cyclotron Autoresonance Masers", V. L. Bratman et al., *Int. J. Electronics*, 51, 541 (1981).

"Induced Resonance Electron Cyclotron Quasi-Optical Maser in an Open Resonator", P. Sprangle et al., *Appl. Phys. Lett.*, 49, 1154 (1986).

Primary Examiner—Léon Scott, Jr.
Attorney, Agent, or Firm—Fitch, Even, Tabin & Flannery

[57] ABSTRACT

A cyclotron autoresonance maser includes an evacuated drift tube with a first end, a second end and an axis. An electron gun introduces a beam of relativistic electrons to the drift tube first end and, for example, a wiggler magnet causes the electrons to gyrate with the gyrations having relatively small radii. A magnetic field generator is provided which forces the beam of relativistic, gyrating electrons to spiral about the axis of the drift tube. The radii of the spirals is large relative to the radii of the gyrations so that the effective interaction length of the electron beam and a maser beam, having an axis substantially coincidental with the axis of the electron beam, is substantially greater than that of a relativistic electron beam and a maser beam which simply cross. A method of generating coherent radiation is also disclosed.

11 Claims, 3 Drawing Sheets

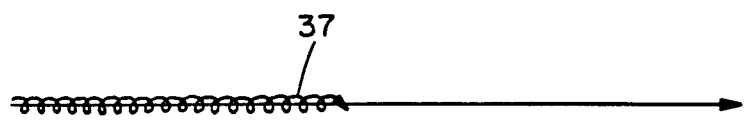
FIG.1
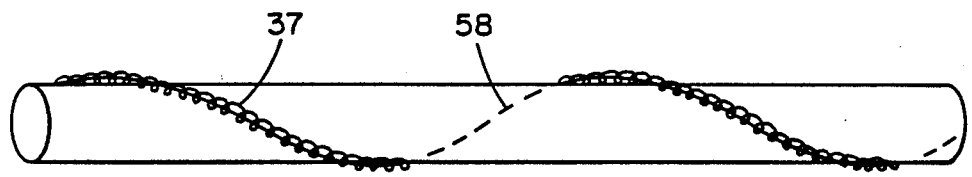
FIG.2
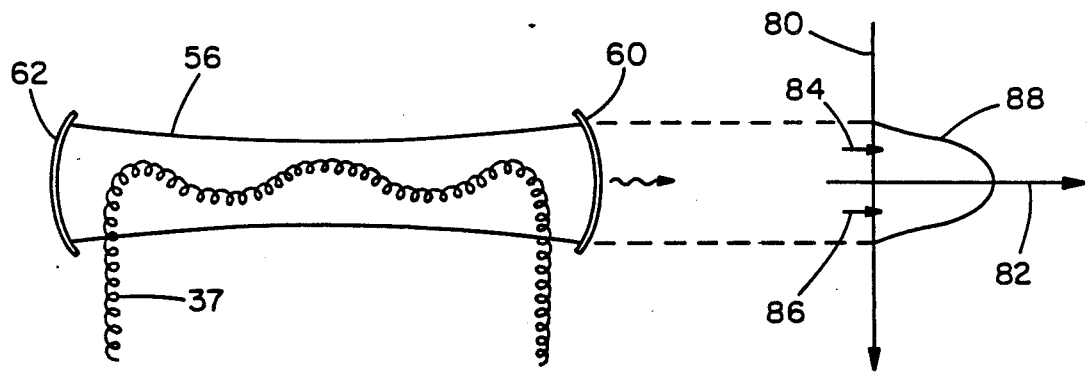
FIG.3A
FIG.3B
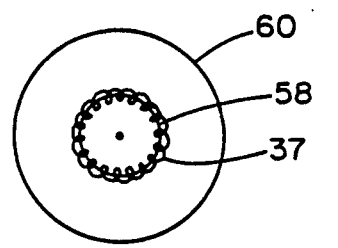
FIG.4
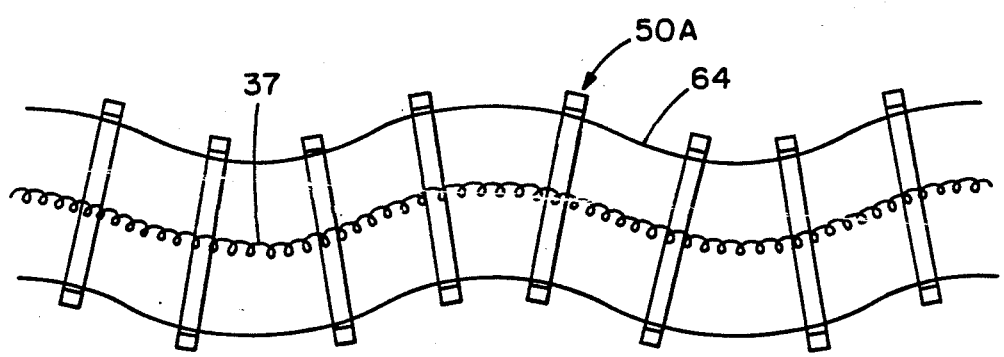
FIG.5

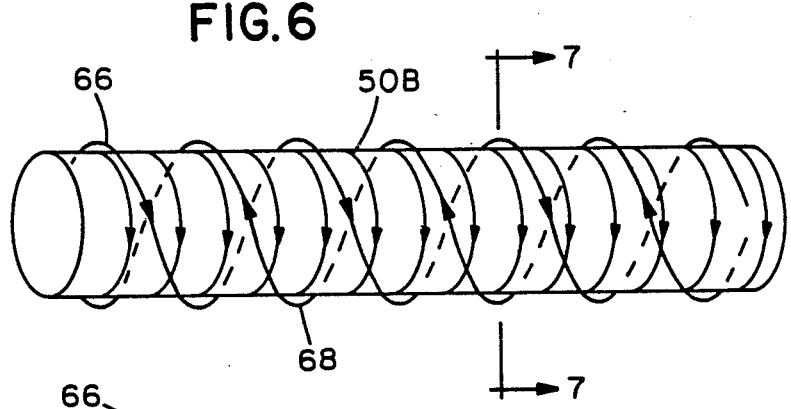
FIG.6
FIG.7
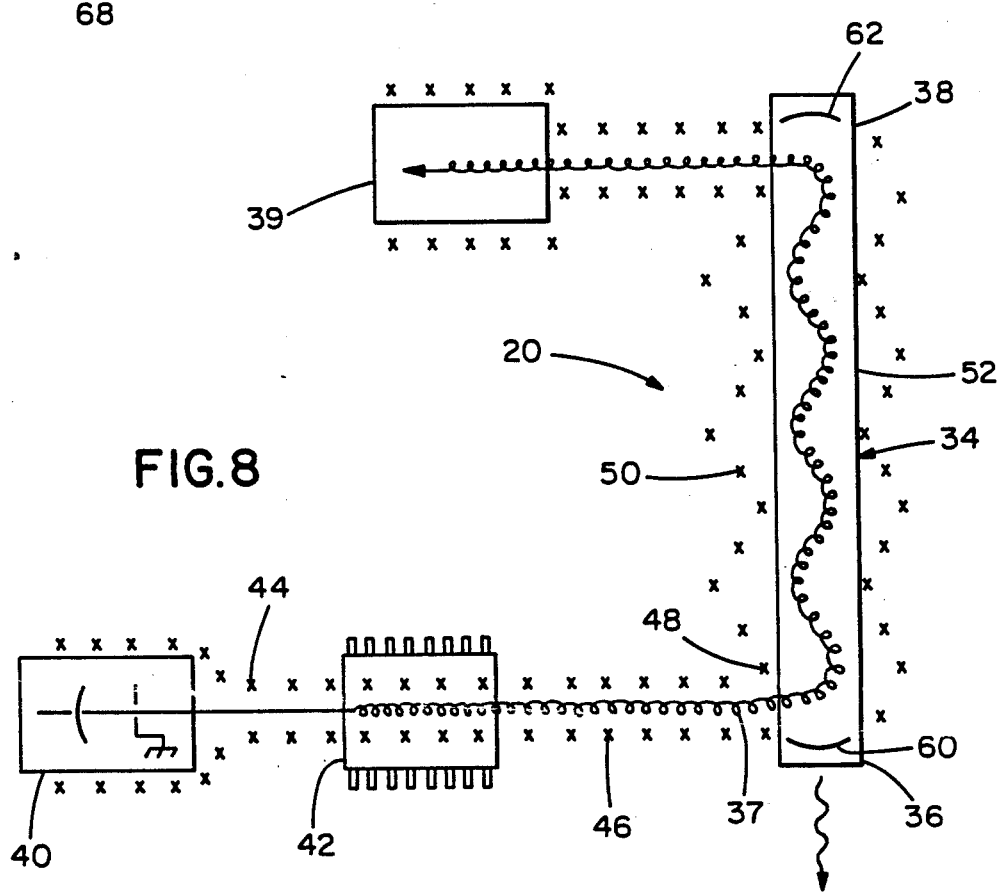
FIG.8

CYCLOTRON AUTORESONANCE MASER WITH HELICAL ELECTRON GUIDING CENTER

The present invention relates to sources of coherent radiation and, more specifically, to a highly efficient type of free electron laser known as a cyclotron autoresonance maser or CARM.

BACKGROUND OF THE INVENTION

The free electron laser is a high power coherent radiation source. In a free electron laser a beam of relativistic electrons is caused to pass through a static periodic magnetic field with resultant amplification of a superimposed coherent optical input. The electrons in the beam are accelerated and decelerated and the laser action is thought to result from stimulated Compton backscattering of the virtual photons in the periodic magnetic field, or stimulated magnetic bremsstrahlung. Unlike atomic lasers, which provide a coherent light output at only a single frequency related to the energy levels of electrons in the atom, free electron lasers are continuously tunable within a range by varying the energy of the beam of electrons and/or by changing the parameters of the periodic magnetic field. For more information regarding the operation and structure of such a free electron laser, reference may be made to U.S. Pat. No. 3,822,410.

A gyrotron is a form of microwave generator based upon the cyclotron maser interaction between an electromagnetic wave and a beam of relativistic electrons in which the individual electrons move along helical paths in the presence of the applied magnetic field. Cyclotron resonance coupling offers the advantage that both the electron beam and the microwave structures can have dimensions which are large compared to the output wavelength. One of the primary uses for a high power gyrotron is considered to be for fusion ignition. For further information regarding the operation of a gyrotron, reference may be made to U.S. Pat. No. 3,398,376.

One proposed free electron laser includes a corkscrew field magnet adjacent the input end of the drift tube for causing relativistic electrons to spiral. This laser also includes an azimuthal magnet system causing the spiraling electrons to undergo accelerations. More specifically, this magnet system causes a scalloped movement of the spiraling electrons. For further information concerning the structure and operation of such a laser, known as a gyro free electron laser, reference may be made to U.S. Pat. No. 4,679,197.

Considered possibly the most efficient type of free electron laser is the cyclotron autoresonance maser (CARM). In the CARM, the wave phase velocity is at least substantially as great as the velocity of light in a vacuum. For further information on the CARM, reference may be made to "Relativistic gyrotrons and cyclotron autoresonance masers", V. L. Bratman et al., *Int. J. Electronics.* 51, 541 (1981); and "Induced resonance electron cyclotron quasi-optical maser in an open resonator", P. Sprangle et al., *Appl. Phys. Lett.*, 49, 1154 (1986). In the CARM discussed in the Bratman et al. paper, the interaction between the electron beam and the radiation beam occurs in a waveguide. The electron beam proceeds along the axis of the waveguide and the radiation reflects off the walls of the waveguide so that the beams periodically cross as the beams travel down the waveguide. With the radiation beam crossing the electron beam at an angle of about 25 degrees, the phase velocity is about 1.1 times the speed of light. The disadvantages attendant the use of a waveguide are that the cross-sectional dimensions of the waveguide must be small, additional modes of electromagnetic wave oscillation may be excited, and the multiple radiation beam reflection occasions heating of the waveguide wall.

A high power radiation source for the frequency range of 140 GHz to 560 GHz has several potential applications. Electron cyclotron resonance heating (ECRH) of high-field tokamaks requires microwave sources in this frequency range that have not been available. For a 10 tesla tokamak, fundamental ECRH heating at 280 GHz is possible if the plasma density is sufficiently low. Second harmonic ECRH heating at 560 GHz may be preferable to avoid constraints on the plasma density. This type of radiation source could also be used for sintering ceramics and for other materials applications requiring efficient absorption of the microwave energy. The absorption length at 280 GHz for even the lowest loss ceramics is less than 10 cm at room temperature. The absorption length decreases with frequency and temperature. Thus sources in the range of 140 GHz to 560 GHz can be very effective in heating thin ceramics. Radar is another potential application. A radar operating above 200 GHz would have much greater resolution than conventional lower frequency radar.

For this frequency range, the CARM has several theoretical advantages relative to its major competitors, the conventional free electron laser and the gyrotron. The conventional free electron laser requires a much higher voltage to produce radiation of the same frequency as a CARM because of the limitations on the minimum size and the maximum field strength of a practical wiggler magnet. The gyrotron operates at a low voltage but requires a higher magnetic field to produce radiation of the same frequency as a CARM. The gyrotron frequency is downshifted as a function of the relativistic factor (the relativistic angular frequency of electron motion about the magnetic field [$\omega$] is proportional to the reciprocal of the relativistic enhancement of the electron mass [$\gamma$]) whereas in a CARM, the frequency is upshifted (roughly, $\omega \sim \gamma$). Taking a maximum magnetic field strength of 10 tesla in a gyrotron device, the maximum fundamental frequency for a non-relativistic gyrotron is 280 GHz.

SUMMARY OF THE INVENTION

Among the several aspects and features of the present invention are the provision of an improved source of coherent radiation in the microwave through ultraviolet frequency ranges. The maser of the present invention provides macroscopic helical motion to gyrating electrons while maintaining the electron beam within the laser beam, thereby significantly increasing the effective interaction length between the two beams. Additionally the cyclotron autoresonance maser avoids the use of a waveguide. Other aspects and features of the present invention will be in part apparent and in part pointed out hereafter in the following specification and accompanying drawings.

Briefly, a cyclotron autoresonance maser embodying various aspects of the present invention includes an evacuated drift tube having a first end, a second end and an axis. An electron source introduces a beam of relativistic electrons into the drift tube first end, and, for example, a wiggler field magnet causes the relativistic electrons to gyrate around field lines with relatively small radii. The source also includes magnetic field means for causing the relativistic gyrating electrons to spiral about the axis of the drift tube. The radii of the spirals are relatively large with respect to the radii of the gyrations to effectively lengthen the interaction between the electron beam and a maser beam which overlaps the electron beam.

As a method of generating coherent radiation, the invention includes the following steps:

(A) introducing a beam of relativistic electrons into the drift tube;

(B) causing the electrons to gyrate with the gyrations having relatively small radii;

(C) causing the beam of gyrating electrons to spiral within the drift tube about the axis and with the radii of the spirals being large relative to the radii of the gyrations; and (D) providing a maser beam of sufficient transverse area to encompass the electron beam in a portion of the drift tube between its ends.

BRIEF DESCRIPTION OF THE DRAWINGS

FIG. 1 is an illustration of a beam of relativistic, gyrating electrons moving along a straight guide path;

FIG. 2 is an illustration showing the beam of gyrating electrons undergoing spiral movement so that they can be considered to gyrate about a helical guiding center;

FIG. 3A shows the beam of gyrating, spiraling electrons in an optical cavity;

FIG. 3B is a graph illustrating the beam of electrons being within the maser beam;

FIG. 4 is an end view of the optical cavity of FIG. 3;

FIG. 5 shows a magnet coil geometry for causing the gyrating electrons of FIG. 1 to undergo the spiral movement shown in FIG. 2;

FIG. 6 shows an alternative coil arrangement for causing the gyrating electrons to spiral;

FIG. 7 is a cross-sectional view of the coil arrangement shown in FIG. 6 taken generally along line 7—7 of FIG. 6;

FIG. 8 is a diagrammatic representation of the coherent radiation source of the present invention configured as an oscillator;

Corresponding reference characters indicate corresponding components throughout the several views of the drawings.

DESCRIPTION OF THE PREFERRED EMBODIMENT

Figure 9:
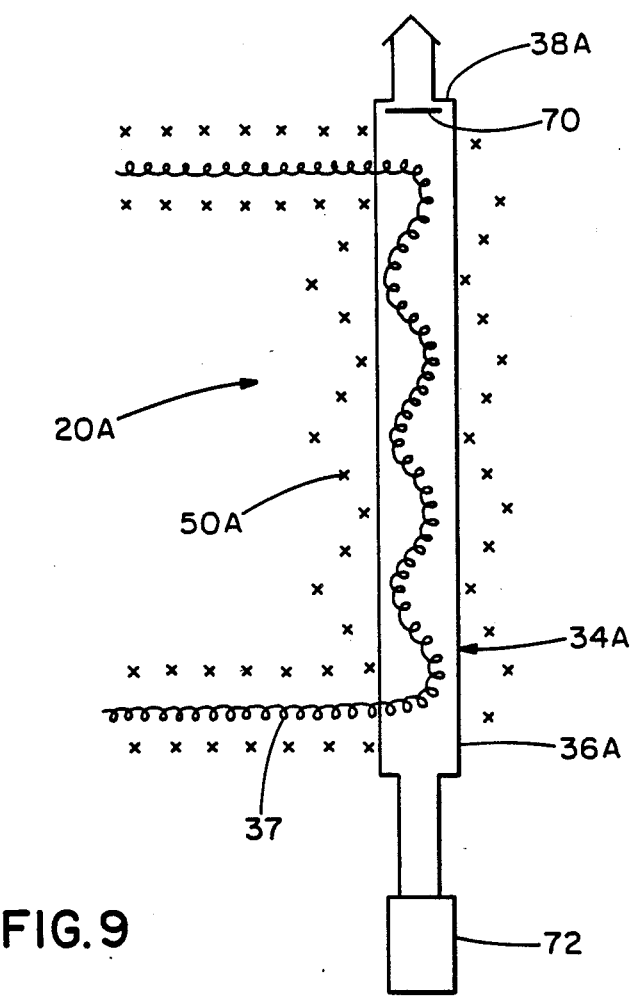
FIG. 9 is a diagrammatic representation of a portion of the radiation source of the present invention configured as an amplifier.

Referring now to the drawings, one preferred embodiment of an improved coherent radiation source 20 of the present invention is shown in FIG. 8. The radiation source 20, which is a cyclotron autoresonance maser, can generate ultrashort wavelength radiation in the microwave through ultraviolet frequency ranges, and includes an evacuated drift tube 34 having a first end 36 for receiving a beam 37 of relativistic electrons, and a second end 38 adjacent which the spent electron beam exits the tube 34 and is directed to an electron beam dump 39. A relativistic electron is one whose kinetic energy is comparable to the rest mass energy of the electron. Roughly, any electron with kinetic energy over 100,000 electron volts may be considered relativistic. A spent electron is simply an electron that is downstream of the interaction region of the drift tube. The tube has an axis 54, see FIG. 10, defining an axial direction.

The source providing the beam of relativistic electrons could be a high voltage electron gun 40. The relativistic electrons are caused to gyrate by magnet means which could be a wiggler or periodic magnet 42 which provides a varying magnetic field. Alternatively, a corkscrew field magnet could be used for causing the relativistic electrons to gyrate with the gyrations having relatively small radii. Such gyration is as shown in FIG. 1, where the electron beam 37 is shown to gyrate about a straight line, which could be a magnetic field line. As shown in FIG. 8, various coils 44, 46 and 48 are provided for directing the beam 37 towards the wiggler magnet 42, towards the first end 36 of the tube 34, and turning the beam coaxial with the tube, respectively.

Figure 10:
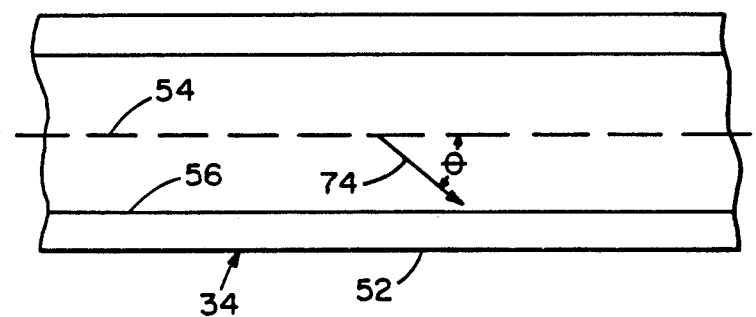
FIG. 10 is a diagrammatic representation showing the constant angle between the axis of the radiation beam and the helical guiding center for the spiraling electron beam.

The coherent radiation source 20 further includes magnetic field means 50 positioned in relation to the central or interaction region 52 of the drift tube 34 for forcing the beam 37 of relativistic, gyrating electrons to spiral about the axis 54 of the tube 34. A maser beam 56 extending between the first end 36 and the second end 38 of the drift tube, as shown by FIG. 10, is coaxial with the tube. FIG. 2 illustrates a beam of gyrating electrons undergoing spiral movement so that the electrons can be considered to gyrate about a helical guiding center path 58. The radii of the spirals are large relatively to the radii of the gyrations. Referring to FIG. 3A, the beam 37 of gyrating, spiraling relativistic electrons is shown in an optical cavity formed between a mirror 60 and a mirror 62 for creating the radiation beam 56. As shown in the accompanying graph of FIG. 3B, which plots distance from the axis of the maser beam 80 versus maser beam amplitude 82, the electron beam the maximum excursion of which is indicated by arrows 84, 86 is positioned within the high intensity portion of the bell-shaped curve 88 representing maser beam amplitude. FIG. 4 is an end view of the optical cavity showing the locus of the helical guiding center 58 and a projection of the electron beam 37.

As shown in FIG. 5, the magnetic field means 50 could take the form of a solenoid 50A having a helical axis and which is wound on a spiral tube 64 of a material permitting penetration by the magnetic field generated by the solenoid 50A. Alternatively, as shown in FIGS. 6 and 7, the magnetic field means could comprise a solenoid winding 50B substantially coaxial with the axis of the drift tube 34, a first helical coil 66 substantially coaxial with the drift tube, and a second helical coil 68 substantially coaxial with the drift tube. The turns of the second coil are disposed between turns of the first coil and have substantially the same pitch. As shown in FIG. 7, the direction of the current in one of the helical coils is towards the drift tube end 36 while the direction of the current in the other of the helical coils is towards end 38.

As will be pointed out in greater detail hereinafter, the coherent radiation source 20 functions to cause the wave phase velocity of maser beam radiation along the spiraling electron beam to be greater than the speed of light. This is accomplished by establishing the angular relationship between the helical guiding center 58 and the maser beam 56. The spiral movement of the gyrating electrons keeps the electron in the maser beam so that there is strong interaction between the beams resulting in efficient radiation from the electron beam.

Referring again to FIG. 8, the first mirror 60, which is partially reflective, is positioned adjacent the first end 36 of the drift tube 34. The second mirror 62 which is fully reflective, is disposed in the tube 34 adjacent its other end 38. The coherent radiation source 20 is configured as an oscillator in that the mirrors 60 and 62 establish a resonant cavity. The deceleration of the spiraling, gyrating electrons causes radiation emission in the direction of the drift tube. This radiation is reflected by the mirrors and results in stimulated emission of radiation due to the interaction of the electron beam and the maser beam. After multiple passes, the radiation loss per pass, through the partially reflective mirror 60, equals the radiation gain per pass due to the interaction so that equilibrium is reached. The radiation "output" end of the drift tube 34 can be changed by reversing the placement of mirrors 60 and 62.

A portion of an alternative preferred embodiment of a coherent radiation source of the present invention which is configured as an amplifier is shown in FIG. 9 by reference character 20A. Components of the radiation source 20A corresponding to components of the source 20 are indicated by the reference number assigned to the corresponding component of the source 20, with the addition of the suffix "A". Components of radiation source 20A which are not shown in FIG. 9 may be identical to corresponding components of source 20 shown in FIG. 8. In the source 20A, a window 70 replaces the mirror at the second end 38A of the drift tube. The source 20A further includes an input signal generator or driver maser 72 for providing and directing a coherent input signal to be amplified into the drift tube 34A. This input signal interacts with the gyrating relativistic electrons to stimulate radiation emission at the same wavelength as the input signal thereby resulting in an amplified output of the coherent radiation input through the transparent window 70.

The magnetic field means, which can be constituted by the solenoid magnet 50A and the spiral tube 64, causes the beam of gyrating, spiraling electrons to be entirely disposed within the beam of coherent radiation 56 generated by the source 20 in its oscillator configuration shown in FIG. 8, or provided by the input signal generator 72 in FIG. 9. Moreover, considering the axis 54 of the drift tube 34 to be the axis of the beam 56 of coherent radiation (see FIG. 10), the magnetic field means maintains substantially constant the angle between a line 74 tangent to the guiding center path 58 and the direction of the axis 54. This angular relationship can be expressed mathematically where the wave phase velocity along the optic axis is:

$$\frac{\omega}{k_{11}} c = \frac{1}{\cos\theta}$$

where
$\omega$ = angular frequency of maser beam in rad/sec
c = speed of light in a vacuum in km/sec,
$k_{11}$ is the maser beam number vector in the direction of the optical axis of the maser cavity,
$\theta$ = the angle (shown in FIG. 10) between the guiding center direction and the direction of the optic axis (or the wave number vector $k_{11}$) of the maser wave, which is defined to be in the direction of the optic axis of the maser cavity.

Accordingly, a wave phase velocity greater than the speed of light is obtained using an electron beam which is spiraling in a helical path in addition to its gyromotion. As the radial excursion of the helical guiding center remains within the beam 56 of coherent radiation, there is an increased interaction length resulting in efficient generation of coherent radiation.

The resonance condition for the interaction is $$\omega - k_{11} V_{11} = \omega_c$$

or $$\omega \left( 1 - \frac{V_{11}}{(\omega/k_{11})} \right) = \omega_c$$

where:
$V_{11}$ is the electron velocity parallel to the the optic axis,
$\omega_c = eB/m_e$ is the electron gyrofrequency in rad/sec,
e is electron charge in coulombs,
$m_e$ is electron mass in kg,
B is magnetic field strength in teslas.

The interaction is stronger for values of $\omega/k_{11}$ significantly above c, the speed of light in vacuum. This method allows $\omega/k_{11}$ to be greater than c without employing a waveguide structure close to the electron beam and without a crossed-beam geometry where the maser beam and the electron beam cross only in a limited region. (See Sprangle et al., supra.) Here the electron beam is continuously at an angle to the optic axis so the strong interaction is maintained over a long path.

As a method of generating coherent radiation in the microwave through ultraviolet ranges using an evacuated drift tube 34 having a first end 36 and a second end 38 the present invention includes several steps:

(A) A beam 37 of relativistic electrons is introduced into the first end of the drift tube.

(B) The relativistic electrons are caused to gyrate with the gyrations having relatively small radii.

(C) The beam 37 of relativistic, gyrating electrons is forced to spiral about a center axis 54, with the radii of the spirals being large relative to the radii of the gyrations.

(D) A beam 56 of coherent radiation is caused to extend between the first and the second ends which is of sufficient size to encompass the spiraling electron beam in a portion of the drift tube between the input and output ends.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cyclotron autoresonance maser comprising:
   an evacuated drift vessel;
   electron beam means for introducing a beam of relativistic electrons into said drift vessel;
   means for causing said relativistic electrons to gyrate within said drift vessel with the gyrations having relatively small radii;

magnetic field means for causing the beam of relativistic, gyrating electrons to spiral within said drift vessel about an axis defining an axial direction, the radii of the spirals being large relative to the radii of said gyrations; and means for establishing and directing a maser beam in said drift vessel in said axial direction, with the maser beam substantially encompassing said spiraling electron beam over a substantial portion of said drift vessel whereby the interaction length of said electron beam and said maser beam is substantially greater than in the absence of said spiraling, the phase velocity of the maser beam radiation along the electron beam being greater than the speed of light.

2. A cyclotron autoresonance maser as set forth in claim 1 wherein said magnetic field means includes means for causing said gyrating electrons to gyrate about helical guiding centers resulting in said spirals, the angle between a line tangent to said guiding center path and the direction of said axis remaining substantially constant in said portion of said drift vessel.

3. A cyclotron autoresonance maser as set forth in claim 1 wherein said means for causing said relativistic electrons to gyrate includes wiggler field means.

4. A cyclotron autoresonance maser as set forth in claim 1 wherein said magnetic field means comprises a solenoid formed spirally.

5. A cyclotron autoresonance maser as set forth in claim 4 wherein said solenoid is disposed about a spiral tube of a material permitting penetration by the magnetic field generated by said solenoid.

6. A cyclotron autoresonance maser as set forth in claim 1 wherein said magnetic field means comprises a solenoid winding, a first helical coil substantially coaxial with said solenoid winding, and a second helical coil substantially coaxial with said first helical coil with turns disposed between turns of said first coil and having substantially the same pitch, and means for passing direct current through said first and second helical coils with the current in said helical coils being in opposite directions about their axes.

7. A cyclotron autoresonance maser as set forth in claim 1 wherein said drift vessel has first and second ends, said means for directing comprises a first mirror disposed adjacent said first end of said drift vessel, and a second mirror disposed adjacent said second end of said drift vessel, one of said mirrors being partially reflective, said mirrors and said drift vessel establishing a resonant cavity so that said maser operates as an oscillator.

8. A cyclotron autoresonance maser as set forth in claim 1 wherein said means for directing comprises an input signal generator for introducing a coherent input signal to be amplified into said vessel, said maser further comprising a window in said drift vessel so that said maser operates as an amplifier.

9. A method of generating coherent radiation in the microwave through ultraviolet frequency ranges in an evacuated drift vessel, said method comprising the following steps:
  A. introducing a beam of relativistic electrons into the drift vessel;
  B. causing the relativistic electrons to gyrate within the drift vessel with the gyrations having relatively small radii;
  C. causing the beam of relativistic, gyrating electrons to spiral within said drift vessel about an axis defining an axial direction, with the radii of the spirals being large relative to the radii of said gyrations; and
  D. providing a maser beam within said drift vessel and of sufficient transverse area to substantially encompass the electron beam over a substantial portion of said drift vessel, the phase velocity of maser beam radiation along the electron beam being greater than the speed of light.

10. A method of generating coherent radiation in the microwave through ultraviolet frequency ranges, said method comprising the following steps:
  A. providing a beam of relativistic electrons;
  B. causing the relativistic electrons to gyrate with the gyrations having relatively small radii;
  C. causing the beam of relativistic, gyrating electrons to spiral about an axis, with the radii of the spirals being relatively large with respect to the radii of the gyrations; and
  D. providing a maser beam which direction generally parallel to said axis, said maser beam resulting from radiation emission caused by deceleration of the spiraling, gyrating electrons and further resulting from interaction of the emission and the electron beam the phase velocity of maser beam radiation along the electron beam being greater than the speed of light.

11. A method of amplifying coherent radiation in the microwave through ultraviolet frequency ranges, said method comprising the following steps:
  A. providing a beam of relativistic electrons;
  B. causing the relativistic electrons to gyrate with the gyrations having relatively small radii;
  C. causing the beam of relativistic, gyrating electrons to spiral about an axis, with the radii of the spirals being relatively large with respect to the radii of said gyrations;
  D. introducing an input maser beam along said axis, resulting in the input maser beam interacting with the gyrating relativistic electrons to provide an output maser beam, the phase velocity of maser beam radiation along the electron beam being greater than the speed of light.

* * * * *

UNITED STATES PATENT AND TRADEMARK OFFICE
CERTIFICATE OF CORRECTION

PATENT NO. : 4,939,740

DATED : July 3, 1990

INVENTOR(S) : Robert R. Goforth

It is certified that error appears in the above-identified patent and that said Letters Patent is hereby corrected as shown below:

Title page, item [56]:
References Cited, U.S. Patent Documents, in the "Hsu" reference, change "378/2" to --372/2--.

References Cited, U.S. Patent Documents, in the "Harvey" reference, change "373/96" to --372/96--.

Column 4, line 38, after "beam" (second occurrence) insert --,--.

Column 4, line 39, after "86" insert a comma.

Column 5, line 5, after "62" insert a comma.

Column 8, line 33, after "which" insert --extends in a--.

Column 8, line 50, after ";" insert --and--.

Signed and Sealed this

Seventeenth Day of September, 1991

Attest:

HARRY F. MANBECK, JR.

*Attesting Officer*  *Commissioner of Patents and Trademarks*